US007363045B2

(12) United States Patent
Rogalski et al.

(10) Patent No.: US 7,363,045 B2
(45) Date of Patent: Apr. 22, 2008

(54) SYSTEMS AND METHODS FOR EXCHANGING DATA AND AUDIO BETWEEN CELLULAR TELEPHONES AND LANDLINE TELEPHONES

(75) Inventors: Gary Rogalski, Richmond (CA); Sukhdeep S. Hundal, Delta (CA); Holger Janssen, Richmond (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 231 days.

(21) Appl. No.: 10/620,566

(22) Filed: Jul. 17, 2003

(65) Prior Publication Data
US 2004/0132500 A1 Jul. 8, 2004

Related U.S. Application Data

(60) Provisional application No. 60/437,743, filed on Jan. 3, 2003.

(51) Int. Cl.
H04Q 7/20 (2006.01)
H04B 1/40 (2006.01)
H04M 1/00 (2006.01)
H04M 9/00 (2006.01)

(52) U.S. Cl. .................. 455/465; 455/74.1; 455/426.1; 379/428.02

(58) Field of Classification Search ................ 455/465, 455/74.1, 554.1, 41.2–41.3, 426.1, 426.2; 379/428.02
See application file for complete search history.

(56) References Cited

U.S. PATENT DOCUMENTS 5,905,956 A * 5/1999 Young et al. ............ 455/435.1
6,018,672 A 1/2000 Werbus
6,205,338 B1 * 3/2001 Kim ........................... 455/462
6,650,871 B1 * 11/2003 Cannon et al. ............ 455/41.2
2002/0160791 A1 * 10/2002 Markowitz ................. 455/462
2003/0045235 A1 * 3/2003 Mooney et al. .............. 455/41

(Continued)

FOREIGN PATENT DOCUMENTS

EP 0 849 965 A1 12/1996

(Continued)

OTHER PUBLICATIONS

Search Report dated Jun. 11, 2004.

(Continued)

Primary Examiner—William Trost
Assistant Examiner—Marivelisse Santiago-Cordero
(74) Attorney, Agent, or Firm—Paul Hastings Janofsky & Walker, LLP

(57) ABSTRACT

Systems and methods for wireless communications between a cellular telephone and a landline telephone. A system includes a cellular telephone in communication with a cordless telephone base station. The cordless telephone base station includes a BLUETOOTH radio transceiver, and the cellular telephone includes a BLUETOOTH radio transceiver, so that the cellular telephone can communicate with the base station using BLUETOOTH communications. The cordless telephone base station includes a cordless radio transceiver, and a cordless handset that includes a cordless radio transceivers. The cordless handset can communicate with the cordless telephone base station using cordless radio frequency communications. The BLUETOOTH radio transceiver and the cordless radio transceiver of the cordless telephone base station are coupled so that the cordless handsets can communicate with the cellular telephone.

20 Claims, 6 Drawing Sheets

U.S. PATENT DOCUMENTS

| | | |
|---|---|---|
| 2003/0144030 A1* | 7/2003 | Newmark .................. 455/557 |
| 2003/0157929 A1 | 8/2003 | Janssen et al. |
| 2003/0236091 A1 | 12/2003 | Wonak et al. |
| 2004/0198342 A1* | 10/2004 | Blickberndt et al. ..... 455/426.1 |
| 2005/0085262 A1* | 4/2005 | Underwood ............ 455/556.1 |
| 2005/0197061 A1* | 9/2005 | Hundal ..................... 455/41.2 |

FOREIGN PATENT DOCUMENTS

| | | |
|---|---|---|
| GB | 2 365 266 | 2/2002 |
| WO | WO 00/04732 | 1/2000 |
| WO | WO 01/50618 | 7/2001 |

OTHER PUBLICATIONS

GB Examination Rpt.

* cited by examiner

SYSTEMS AND METHODS FOR EXCHANGING DATA AND AUDIO BETWEEN CELLULAR TELEPHONES AND LANDLINE TELEPHONES

CROSS-REFERENCE TO RELATED APPLICATION

This application claims the benefit of U.S. Provisional Patent Application Ser. No. 60/437,743 filed Jan. 3, 2003, which is herein incorporated by reference in its entirety.

BACKGROUND OF THE INVENTION

1. Field of the Invention

The present invention relates to communications systems. More particularly, the present invention relates to systems and methods for exchanging data and audio between cellular telephones and landline telephones.

2. Background Information

Many users (e.g., consumers, business persons, etc.) possess both a landline telephone and a cellular telephone. While telephone infrastructure varies from country to country, the United States infrastructure provides a useful starting point for purposes of this description. In the United States, a landline telephone can be a cordless or corded telephone that is coupled to a central office ("CO") of a local exchange carrier ("LEC") such as a Regional Bell Operating Company ("RBOC"), a competitive local exchange carrier ("CLEC"), and so on. Cordless telephones have no cord between the handset and base. Instead, the handset and base each have a radio transmitter, receiver and antenna to allow communication between the handset and base. Typically, the handset includes a rechargeable battery, and the base is powered by current from an alternating current ("AC") outlet (e.g., of a house, office, etc.). In a residential environment, the base is typically coupled to the CO via one or more wires, such as an RJ-11 wire that couples the base to an RJ-11 jack on a wall. The RJ-11 jack is typically coupled to the CO via a twisted-pair wire.

As used to describe the background and embodiments of the present invention, the term "coupled" encompasses a direct connection, an indirect connection, or a combination thereof. Two devices that are coupled can engage in direct communication, in indirect communication, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

The range of effective communications between the handset and base can be from about 10 feet to several miles depending on factors such as product design, operating radio frequency, environmental conditions, and legal restrictions (e.g., laws, regulations, etc.). Examples of known operating radio frequencies for cordless telephone communications in the United States include 900 Megahertz ("MHz"), 2.4 Gigahertz ("GHz"), 5.8 GHz, a combination thereof, and so on.

An example of a cellular telephone is a handheld cellular radio transceiver (transmitter/receiver) that operates in a cellular service area composed of a plurality of cells. Each cell is populated with one or more low-powered radio transceivers that communicate with the cellular telephones in or about the cell. Adjoining cells typically operate at different radio frequencies. Each cell's radio transceiver is coupled to a Mobile Telephone Switching Office ("MTSO"), that can monitor the movement, if any, of the cellular telephone (e.g., by determining or receiving signal strength indicators corresponding to the cellular telephone) through the cell such that at the proper time the cellular telephone can be handed-off from a current cell to a next cell. Examples of cellular telephone systems include Personal Communications Service ("PCS") systems, Global System for Mobile Communications ("GSM") systems, Code Division Multiple Access ("CDMA") systems, Time Division Multiple Access ("TDMA") systems, analog and/or digital Advanced Mobile Phone Service ("AMPS") systems, and so on. Cellular telephone systems in the United States operate at or around 1900 MHz (e.g., GSM 1900 systems, Digital AMPS, and CDMA 1900 systems), in the 800-900 MHz range (e.g., analog AMPS), and so on.

Many users own both a landline telephone and a cellular telephone. There is a strong user desire to use cellular telephone services (e.g., to take advantage of free night and weekend calls) from the comfort of the home landline telephone. Other users want to use the handset of their cordless telephone to communicate with others via the wireless network of the cellular telephone. For example, a user may want to take an incoming call received by the cellular telephone using the cordless handset while the cellular telephone is charging in its docking station. As another example, the user may want to access or transfer data between the cellular telephone and his home telephone (e.g., access or copy the cellular address book into his home telephone).

Known systems that couple a cellular telephone to a landline telephone rely on a physical connection to exchange control information, data and audio. Problems with such systems include, for example, mechanical contour, physical connector, electrical, and protocol problems. With respect to mechanical contour, a cellular telephone cradle is required and this cradle must physically fit the cellular telephone. A physical connector matching the cellular telephone connector is required, and the exact electrical characteristics of each cellular telephone must be followed. With respect to protocol, the exact protocol and command set provided by the cellular telephone must be used. None of the above factors are standardized, and existing cellular telephones differ radically in the above attributes. Hardware (e.g., mechanical, electrical, and electronic) and software development is typically required to support new cellular telephones. In view of the foregoing, it can be appreciated that a substantial need exists for systems and methods that can advantageously provide for wireless communications between cellular telephones and landline telephones.

BRIEF SUMMARY OF THE INVENTION

Embodiments of the present invention relate to systems and methods for exchanging data or audio between one or more cellular telephones and a landline telephone. For example, in an embodiment, a system includes a cellular telephone in communication with a cordless telephone base station. The cordless telephone base station includes a BLUETOOTH radio transceiver and a BLUETOOTH antenna, and the cellular telephones include a BLUETOOTH radio transceiver and a BLUETOOTH antenna, so that the cellular telephone can communicate with the base station using BLUETOOTH communications. The cordless telephone base station includes a cordless radio transceiver and a cordless radio antenna, and cordless handsets include cordless radio transceivers and antennas, so that the cordless handset can communicate with the cordless telephone base station using cordless radio frequency communications. The BLUETOOTH radio transceiver and the cordless radio transceiver of the cordless telephone base station are coupled so that user can use the cordless handsets to make, receive and conference calls on a cell line of the cellular telephones.

According to another embodiment of the present invention, a landline telephone base station includes an audio router. The audio router can send and receive audio signal communications with a BLUETOOTH protocol stack and transcoder. The audio router can also send and receive audio signal communications with a cordless protocol stack and transcoder. The audio router thereby couples, at least in part, at least one cellular telephones to the landline telephone base station. The landline telephone base station encompasses a corded and/or cordless telephone base station. The audio router can also "add" audio signals from three or more audio sources (cellular telephones or cordless handsets) to create conference calls with multiple parties.

According to another embodiment of the present invention, a landline telephone base station supports two transceivers, one for a cordless link to cordless telephone working in an ISM band such as 2.4 GHz WDCT, and the other for cordless wireless connection to a BLUETOOTH enabled cellular telephone. A cellular telephone connects a wireless connection with a landline telephone base station once the cellular telephone is within a predetermined range from the landline telephone base station using BLUETOOTH short range wireless technology without a need for physically connecting between the cellular telephone and the landline telephone base station. The telephone of the invention is BLUETOOTH enabled with headset profile support. The headset profile is used to exchange audio (SCO connection). A serial link (ACL) connection is used to exchange data.

Figure 1:
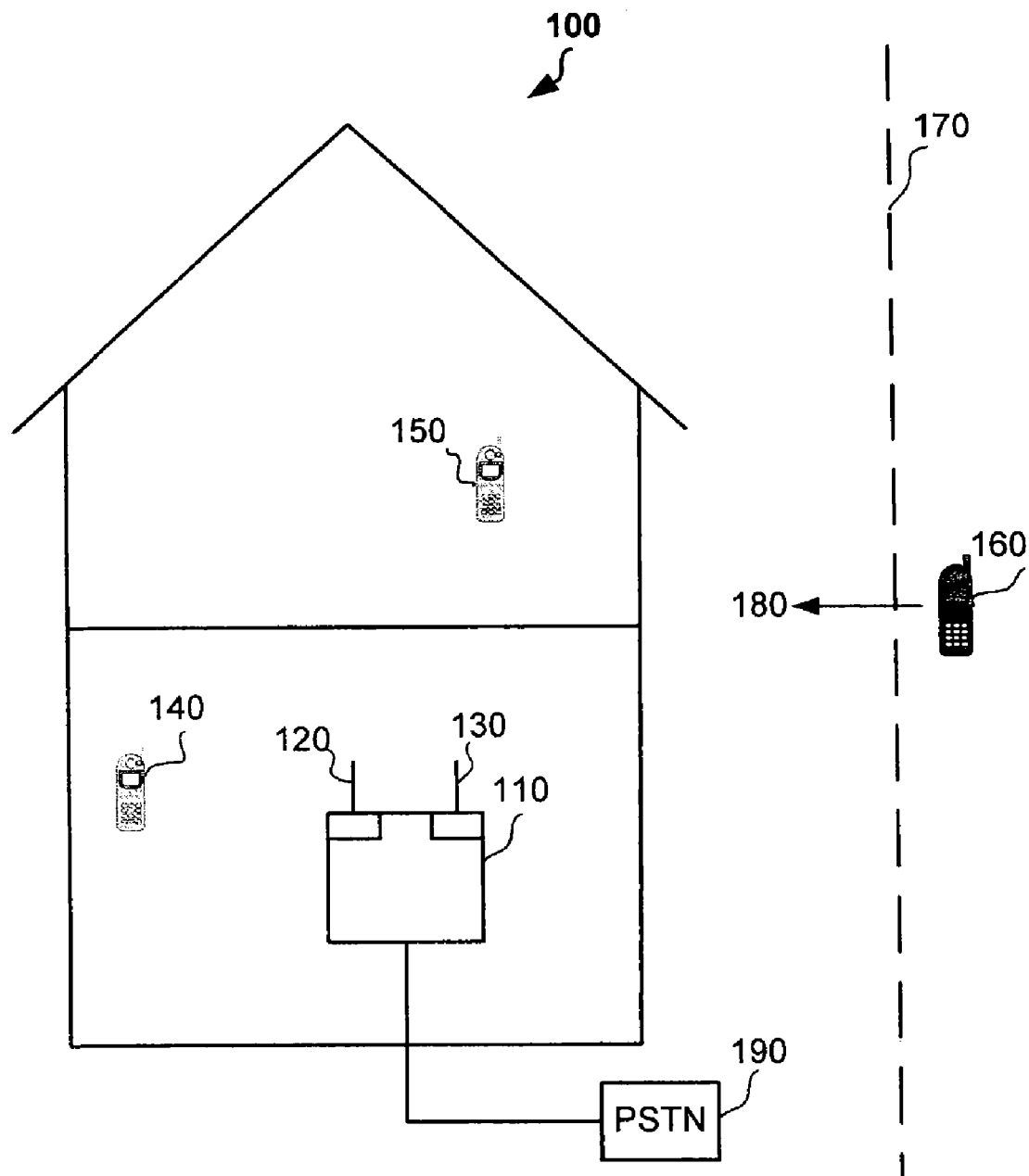
FIG. 1 shows a schematic diagram of an exemplary wireless communications system of the present invention embodied in a house for data exchanges between a cellular telephone and a landline telephone base station.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

According to an embodiment of the present invention, a system and/or method provides for exchanging data and audio between a cellular telephone and a landline telephone (e.g., corded telephone, cordless telephone, etc.) via BLUETOOTH short range wireless technology without a physical connection. Exemplary applications of the invention include using a landline telephone to make, receive, end, and conference calls via a cellular telephone line. Other applications of the present invention include exchanging data (e.g., call logs, phone books, Caller Identification ("CID"), call waiting indicators and identifiers, message waiting indication such as voicemail in wireless mail box or SMS indication, etc.) between the landline telephone and the cellular telephone. Additional applications can include, for example, accessing cellular communication services (e.g., message mailboxes) from the landline telephone. Persons of skill in the art can appreciate further applications of the invention based upon the disclosure provided herein.

The invention, in a preferred embodiment, uses BLUETOOTH wireless technology to link a cellular telephone to a landline telephone (e.g., residential telephone, etc.) for the purpose of establishing, answering, placing and conferencing incoming and outgoing calls using corded or cordless landline telephones. In this manner, the present invention can use standard GSM and/or CDMA AT commands to exchange data and manage incoming and outgoing cellular calls from the landline telephone. BLUETOOTH technology is used for the connection between the cellular telephone and the landline telephone base station. For example, a BLUETOOTH communications subsystem and a cordless telephone subsystem can be integrated within one landline telephone system. An audio router can combine call from a cellular network coming over the cellular telephone and PSTN call/calls over fixed line into one conference call. That is, a user can use a home (landline) telephone to create a conference call by calling two people who are on a PSTN line and a cellular line, respectively.

According to another embodiment, the present invention uses widely deployed standard BLUETOOTH wireless technology to exchange audio and data, so that a large number of products (e.g., a cellular telephone, a Personal Digital Assistant, a personal computer, etc.) can exchange data and audio with a landline telephone system.

Embodiments of the present invention can advantageously provide wireless communications between one or more cellular telephones and landline telephones without a mechanical or physical communications connection to and from the cellular telephone (e.g., without a communications cradle, without a physical communications connector, etc.). Because there is no mechanical or physical communications connection, the electrical characteristics of the physical cellular telephone control and communications interface can be irrelevant to embodiments of the present invention. Furthermore, an embodiment of the present invention operates as soon as cellular telephone is within a range (e.g., BLUETOOTH's RF range) of a BLUETOOTH receiver of a landline telephone base station. Therefore, even if the cellular telephone is left in a purse or a car, but as long as the purse or car is within the range, user can still use a landline telephone to make or receive cellular telephone calls via the cellular network associated with the cellular telephone.

Embodiments of the present invention deploys an unique BLUETOOTH stack configuration embedded in a cordless base unit or a cordless handset to support a BLUETOOTH profiles. This BLUETOOTH stack configuration reduces development time and product complexity where most of the BLUE TOOTH stack is running on the module itself and only the control and user interface is running from the base station/handset or the host. The BLUETOOTH module is controlled by a landline telephone base station using AT commands over Universal Asynchronous Receiver/transmitter (UART) or any other interface. One purpose of the BLUETOOTH headset profile is to establish an audio link between a gateway that a cellular telephone is embedded with and a headset of the landline telephone base station. Once the audio link is established, the base station exchanges data between the gateway and the headset via the BLUETOOTH.

FIG. 1 is an exemplary schematic diagram of a wireless communications system of the present invention embodied in a house for data exchange between a cellular telephone and a landline telephone base station. System 100 includes a BLUETOOTH enabled telephone base station 110 that may be a landline telephone base station connecting to Public Switched Telephone Network (PSTN) 190. Landline telephone base station 110 communicates with one or more cordless landline handsets 140, 150 via a cordless antenna 120 and with one or more BLUETOOTH enabled cellular telephones 160 via a BLUETOOTH antenna 130. As known in the art, the effective communications range of landline telephone base station 110 can be as far as several miles. On a more practical scale, cordless landline handsets 140, 150 can be used at different areas of the house. For example, landline handset 150 can be used at a second floor while landline telephone base station 110 is installed at a first floor.

Reference number 170 represents a virtual border line of a communication range of BLUETOOTH antenna 130. Once crossing border line 170 in direction 180, cellular telephone 160 can communicate with landline telephone base station 110 using BLUETOOTH short range communications without any physical connection. After wirelessly connecting with landline telephone base station 110, users can use landline handsets, e.g., either handset 140 or 150, to make or receives cellular calls via the cellular network associated with cellular telephone 160.

The wireless connection of cellular telephone 160 and landline telephone base station 110 can be done automatically or manually. In an automatic mode, landline telephone base station 110 automatically communicates with cellular telephone 160 as soon as BLUETOOTH antenna 130 receives signals from cellular telephone 160. In a manual mode, landline telephone base station 110 does not communicate with cellular telephone 160 until an activation message is initiated. The activation message may include, for example, entering codes from landline telephone base station 110 or cellular telephone 160 to initiate a BLUETOOTH session between base station 110 and cellular telephone 160. It ensures a security and authentication built between landline telephone base station 110 and cellular telephone 160 so that base station 110 communicates with a specific cellular telephone correctly when there are more than one cellular telephones existed. Furthermore, in some cases, even the landline telephone base station has connected with a first cellular telephone, the user can still manually select a second cellular telephone for one-time use only. After a usage of the second cellular telephone, the connection of the base station is automatically switched back to the first cellular telephone. In either manner, there is no need to provide a physical connection, such as placing cellular telephone 160 in a cradle or activating a connector. In this case, landline telephone base station 110 works similarly to a two-line-telephone base station, i.e., handset one (such as handset 140) is connected to PSTN 190 via a fixed line, while handset two (such as handset 150) is making or receiving a call over the cellular network. Alternatively, PSTN and cellular lines can be conferenced into one call with a cordless handset and/or base speakerphone or corded handset. The details of the system of the present invention will be described below.

Figure 2:
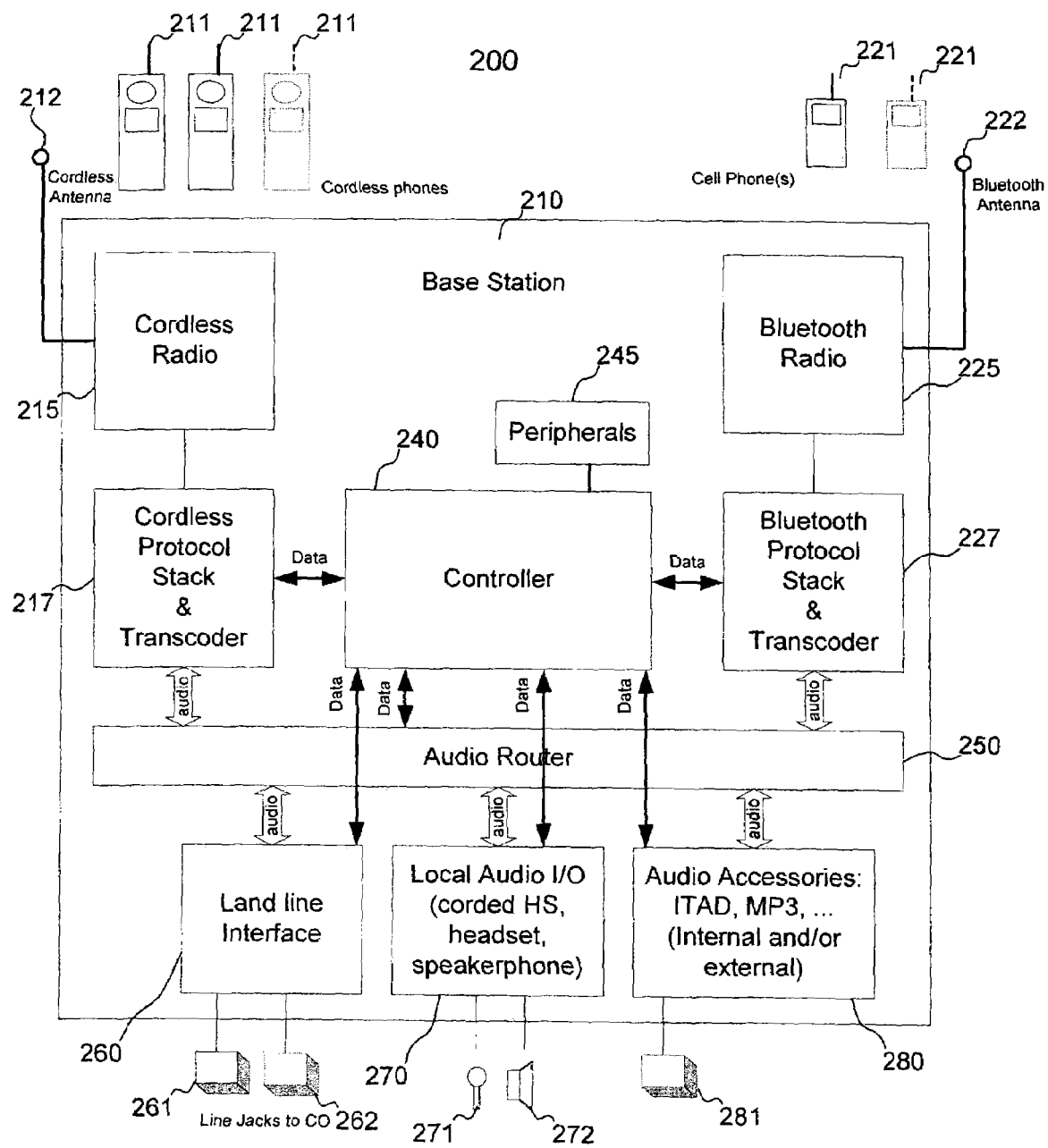
FIG. 2 shows a system diagram of an embodiment of the present invention for wireless communications between a landline telephone base station and one or more cellular telephones.

FIG. 2 shows an exemplary system diagram of an embodiment of the present invention for exchanging data between landline telephone set and one or more cellular telephones. Landline telephone set 200 includes a BLUETOOTH enabled landline telephone base station ("base station") 210. Base station 210 is a fixed part of telephone set 200. Base station 210 supports two transceivers. One is cordless transceiver used for a cordless radio link, which includes cordless antenna 212 and cordless radio 215.

Landline cordless handsets 211 communicate with base station 210 over the cordless radio link. Examples of the cordless radio link include a 2.4 GHz Worldwide Digital Cordless Telecommunications ("WDCT") link, a 900 MHz cordless link, a 5.8 MHz cordless link, and so on. Cordless radio 215 is coupled to cordless protocol stack and transcoder 217. The cordless protocol stack and transcoder 217 encompasses, for example, an Adaptive Differential Pulse Code Modulation ("ADPCM") to Pulse Code Modulation ("PCM") transcoder. Multiple cordless handsets 211 can be active simultaneously. The decoded audio from each active cordless handset can be sent to the Audio Router 250.

A second transceiver is a BLUETOOTH transceiver used for cordless/wireless radio link including BLUETOOTH antenna 222 and BLUETOOTH radio 225. A cellular telephone 221 exchanges data and audio with base station 210 via the BLUETOOTH radio/wireless link. BLUETOOTH radio 225 of base station 210 is coupled to the BLUETOOTH Protocol Stack and Transcoder 227. An example of BLUETOOTH Protocol Stack & Transcoder 227 is a Continuously Variable Slope Delta ("CVSD") modulation to PCM transcoder. The decoded audio and data from the one or more cellular telephones 221 is sent to Audio Router 250.

Audio Router 250 can setup multiple concurrent calls with two or more end points (e.g., a first cordless handset on a call over a first landline, a second cordless handset on a conference call with a base speakerphone and a second landline, both while an ITAD (Integrated Telephone Answering Device) is recording an incoming message from a cellular telephone). For example, a known system, such as the VT20-2481 system made by VTech, includes an audio router to combine up to four cordless handsets, a speakerphone, an ITAD and two lines into up to four calls or into one conference call with eight parties. In another example, a known system, such as VT20-2437 made by VTech uses hardware interface for communication between a cellular telephone and a cordless base station.

Central controller 240 can perform one or more tasks. For example, central controller 240 can (i) control the audio router to set up and end calls and conferences; (ii) control the local I/O devices (e.g., a keypad, a six-line LCD display, color graphic LCD display, etc.), data storage (e.g., telephone book, call logs, MMI parameters, etc); (iii) perform registration of remote devices (cordless and cellular); (iv)

implement security services (recognizes, identifies and authenticates BLUETOOTH devices); (v) support data exchange (e.g., remote access of address book and call logs, address book synchronization, processing of text messages, SMS from cellular to handset, games over cellular network, etc.). In an embodiment, the central controller includes a Digital Signal Processor ("DSP") coupled with an embedded microprocessor. Central controller 240 can also couple with peripherals 245 such as keypad, LCD, etc.

System 210 also can support a number of conventional landlines through landline interface 260, which can be coupled to a first line jack 261 to a central office ("CO") and a second line jack 262 to the same central office. Known 2.4 GHz cordless telephone systems include, for example, two and four line landline interfaces. Digitized audio from each telephone line coupled to line jacks 261, 262 is sent to Audio Router 250. Local Audio Input and Output (I/O) devices can also be connected to Audio Router 250 via Local Audio I/O interface 270. Examples of local audio devices that can be coupled to local audio I/O interface 270 include a speakerphone comprised of a microphone 271 and a speaker 272, a corded headset, a wireless headset and adapter, and so on. For example, a known system such as the Advanced American Telephones AT&T Model 2462 Two Line Corded/Cordless Answering System includes a speaker and microphone, headset jack, and corded handset. Base station 210 can also include an audio accessories interface 280 and an audio accessory port or connector 281. Examples of audio accessories that can be coupled to audio accessory interface 280 include an ITAD, an MP3 player, and so on.

In accordance with the present invention, communications between landline telephone base station 210 and a BLUETOOTH-enabled cellular telephone 221 that includes a BLUETOOTH transceiver (not shown) and a headset profile. There are many different profiles that can be supported by the BLUETOOTH protocol for different applications. However, a headset profile is currently the most widely supported by cellular telephones. Therefore, the embodiment of the present invention focuses on a headset profile to exchange data between landline telephone base station 210 and BLUETOOTH enabled cellular telephone 221 that supports the headset profile. Nevertheless, other profiles such as cordless telephone protocol (CTP) and handfree profile, can be also applied to the present invention. Furthermore, landline telephone base station 210 can be a corded telephone base station that shares the BLUETOOTH protocol. In this case, handsets 211 can be corded handsets.

Figure 3:
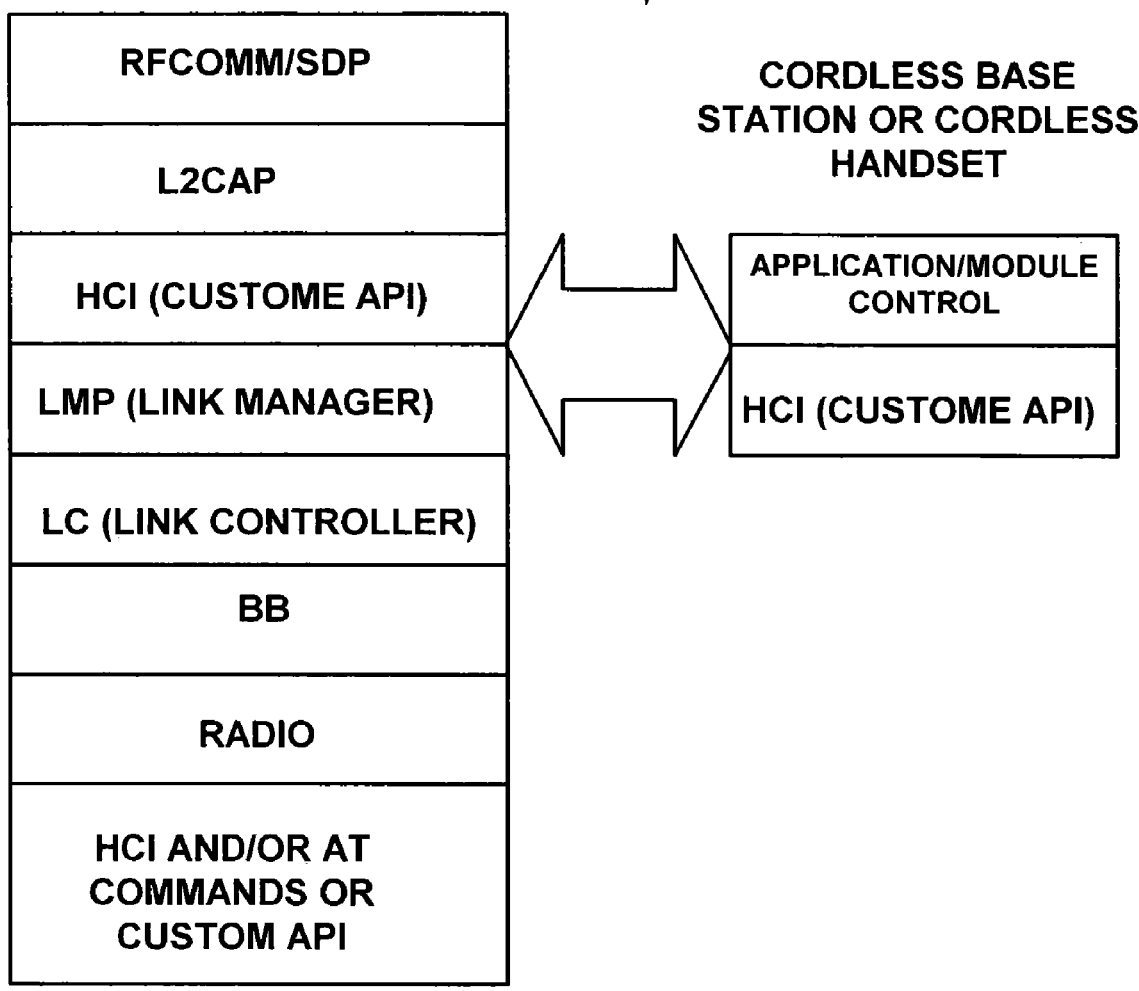
FIG. 3 shows a BLUETOOTH module to support a BLUETOOTH headset protocol for exchanging audio and data between BLUETOOTH enabled landline telephone and a BT enabled cellular telephone.

A BLUETOOTH module that can support the BLUETOOTH headset profile deployed by the present invention is shown in FIG. 3. BLUETOOTH module 300 can be integrated with base station 210, for example, in BLUETOOTH protocol stack and transcoder 227. Please note that it is also possible that base station 210 is connected to a PC over BLUETOOTH or other wireless connection or hardware connection to support other applications.

FIG. 3 shows the various components of the Bluetooth module, left hand side components (hardware and software) are embedded in the BT module/transceiver while the right hand side is on the cordless base station or the cellular telephone handset. In such configuration, base station 210 controls BLUETOOTH module 300 using AT commands over Universal Asynchronous Receiver/Transmitter (UART). Whenever a BLUETOOTH enabled cellular telephone (such as cellular telephone 221) is within the range of base station 210 (for example, on the left side of border line 170 shown in FIG. 1), a wireless connection is established between cellular telephone 221 and base station 210. As described above, the wireless connection can be established automatically or manually, depending on design. Once cellular telephone 221 connects with base station 210, base station 211 can use a standard GSM/CDMA AT commands over the BLUETOOTH link to manage incoming/outgoing calls over cellular telephone 221 and exchange data such as caller ID, address books, etc. GSM standard defines a set of standard AT commands to be provided by GSM cellular telephones. CDMA standard defines a set of standard AT commands to be provided by certain cellular telephone systems and some WLAN. As GSM and CDMA standards are well known in the art, further descriptions to GSM and CDMA standards are omitted.

A main application of the BLUETOOTH handset profile is to provide an audio link between an audio gateway and a landline handset. In accordance with the present invention, cellular telephone (standard configuration) is embedded with the audio gateway and a BLUETOOTH headset function is integrated in base station 210. The purpose of the BLUETOOTH headset function integrated with base station 210 is to facilitate exchange of audio and data between base station 210 and cellular telephone 221. In general, a BLUETOOTH handset profile supports an audio exchange but does not support a data exchange. Therefore, to manage the audio link to exchange audio and data between audio gateway and a headset (such as a cordless headset 211), in accordance with the present invention, a data link using ACL packets is first established between the audio gateway and the headset before the audio link is established by using Radio Frequency Communications and Service Discovery Protocol ("RFCOMM/SDP"). Via the ACL connection, a user can use landline headset such as handset 211 that communicates with base station 210 to exchange data with cellular telephone 221. The data link can be maintained in parallel with the audio link using ACL connection, but no packets switching is performed over the data link if there is no data transferred between landline telephone base station 210 and cellular telephone 221.

In accordance with the present invention, one feature of using the ACL-packet connection is that once the audio link is established, no additional radio resources will be used unless a data exchange between cellular telephone 221 and landline base station 210 is initiated. That is, the present invention utilizes the BLUETOOTH wireless communications to exchange data between cellular telephone 221 and landline base station 210 only when a user uses headset 211 of landline base station 210 to receive incoming calls for cellular telephone 221, to send outgoing calls on behalf of cellular telephone 221, or to access data stored in cellular telephone 221 such as telephone books. When no data exchange is needed, the ACL connection does not use any radio resources, but always remains present at logical level.

In addition, cellular telephone 221 supports AT commands over a physical serial port as well as an Infrared Data Association (IrDA) and BLUETOOTH interfaces. A serial port profile defines the requirements for Radio Frequency Communications and Service Discovery Protocol ("RFCOMM/SDP") to provide emulation of a serial port over the Logical Link Control and Adaptive Protocol ("L2CAP"). BLUETOOTH specification explains the Serial Port Profile. Base station 210 uses a logical serial connection over a BLUETOOTH interface that exists between the audio gateway and the headset (but BLUETOOTH is embedded in base station 210). The audio gateway and the headset are two parts of the headset profile. The audio gateway is embedded in cellular telephone 221 and the headset part is embedded in landline telephone base station 210. They are used to exchange audio. Cellular telephone 221 responds to the AT commands over the BLUETOOTH interface that is handled by a control/application software on base station 210. In case an audio connection is already established between base station 210 and cellular telephone 221, an ACL connection will be used in parallel with an audio connection (SCO) or by muting the audio connection (SCO) link to send data packets over the SCO link. BLUETOOTH allows DM1 data packets to be sent over a SCO connection. In the case that there is no audio connection, an ACL connection will be established for exchange of data/AT commands to manage incoming and outgoing cellular calls from a landline cordless handset. Furthermore, in accordance with the present invention, if the ACL connection used for the handset or any other profile could not be used for AT commands exchange between the cordless base station and the cellular telephone, a SPP (Serial Port Profile, not shown) connection parallel with the ACL/SCO connection is set up to facilitate the AT command exchange.

According to an embodiment of the present invention, multiple cellular telephones 221 can be registered with the base station 110, although handset 211 can only receive/send calls for one cellular telephone 221 at one time. The base station 210 can keep track of registered cellular telephones 221 within the range of the base station 210. Cordless handsets 211 and/or base station 210 implement a context sensitive Man Machine Interface (MMI) that adapts according to the presence or absence of registered cellular telephones within BLUETOOTH range. A known system is the AT&T Model 2462 Two Line Corded/Cordless Answering System, which includes a 6-line Liquid Crystal Display (LCD) and three softkeys. The softkeys are located below the LCD and can hence be assigned different functionality according to the application context. Further, the remainder of the LCD provides a "soft-menu," in which menu items can be scrolled up and down and selected using the softkeys. In an embodiment of the present invention the soft-menu can be re-configured according to the availability and current state of registered cellular telephones. The dialing menu can provide a choice of cellular telephones that can be used for placing an outgoing call. In an embodiment, only cellular telephones that are within range are available in the dialing menu. Similarly all cellular data related menus on the base station 210 and handset 211 are dynamically configured to reflect the ability and availability of the registered cellular telephones. Another menu allows the registration of additional cellular telephones to be used by the telephone set 200.

Figure 4:
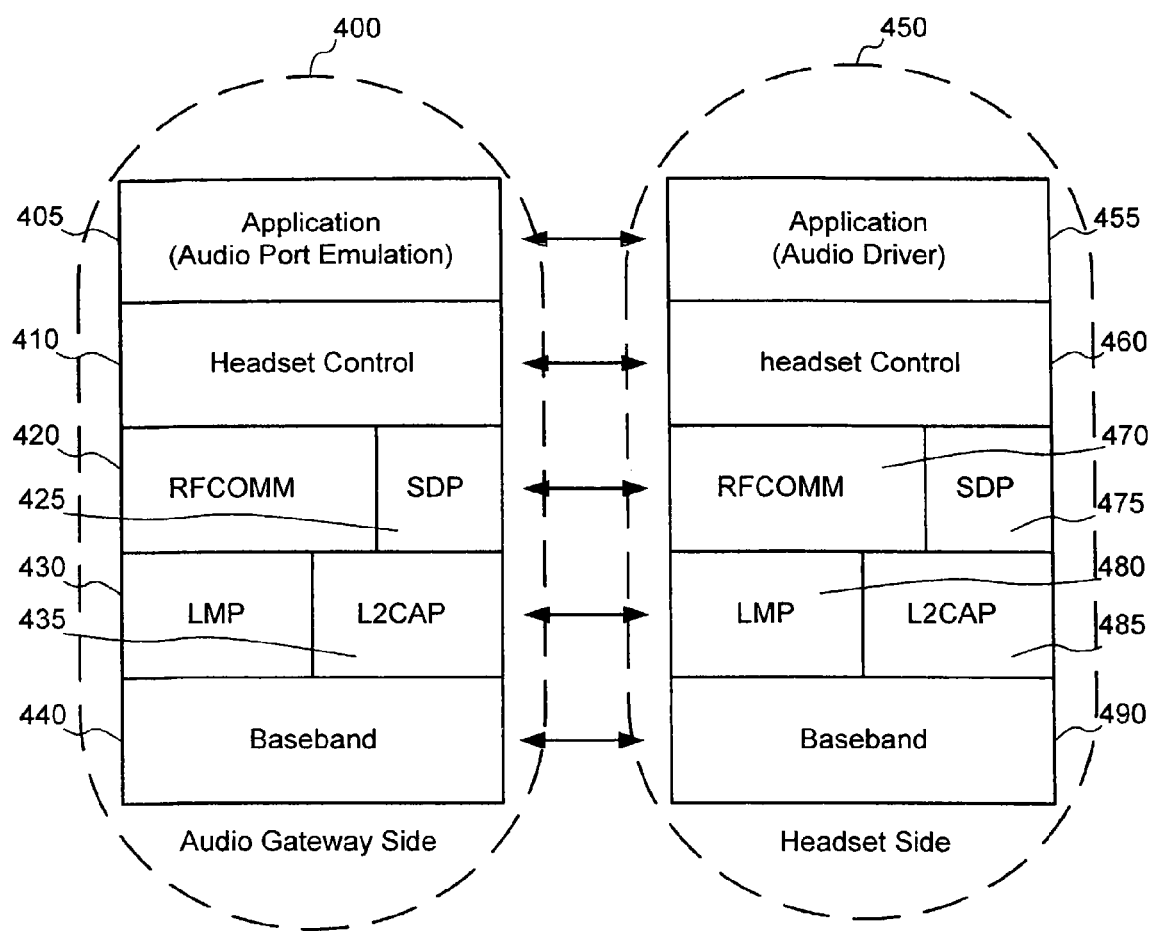
FIG. 4 shows protocols and entities used to transfer audio between a landline telephone base station and a cellular telephone according to an embodiment of the present invention.

FIG. 4 shows an exemplary BLUETOOTH Protocol stack entities used in the BLUETOOTH headset profile of the present invention. To support existing cellular telephones on the market, base station 210 can enact a headset according a headset or BLUETOOTH specification. Audio Gateway protocol stack 400 resides in BLUETOOTH enabled cellular telephones (e.g., cellular telephone 221) that support the headset profile. Base station 210 emulates one or more headset sides 450 as shown in FIG. 4. Audio Gateway protocol stack 400 and headset protocol stack 450 include a plurality of entities including an application entity 405 that provides audio port emulation. Application entity 405 corresponds to the Headset Side's (i.e., the base station's) application entity 455, which comprises an audio driver. The BLUETOOTH K6 profile teaches that each of audio gateway protocol stack 400 and headset side protocol stack 450 include corresponding entities such as headset control entities 410 and 460 for the headset specific control signaling. Note that this signaling is AT command based. RFCOMM protocol 420 and 470 provides emulation of serial port. It uses L2CAP 435, L2CAP 485, service discovery protocol (SDP) 425, and SDP 475 to discover which services are available and to characterize the available services. The Link Manager (LM) performs link setup, authentication, link configuration and other protocols. It discovers other remote LM's and communicates with them via Link Manager Protocol (LMP) 430 and 480. LMP 430 and 480 and L2CAP 435 and 485 are layered over Baseband Protocol 440 and 490.

As an alternative to the headset profile described above, a Cordless Telephony profile could be used if it should become available on a sufficient number of cellular telephones in the market place. At present, the Headset Profile seemed most likely to gain acceptance in the field. The Cordless Telephony profile defines requirements for the "3-in-1" telephony application. The BLUETOOTH specification explains the Cordless Telephony profile. The "3-in-1 telephone" is a solution for providing an extra mode of operation to cellular telephones, using BLUETOOTH as a short-range bearer for accessing fixed network telephony services via a base station. However, the 3-in-1 telephone use case can also be applied generally for wireless telephony in a residential or small office environment, for example, for cordless-only telephony or cordless telephony services in a personal computer. Hence the profile name "Cordless Telephony".

The BLUETOOTH antenna can be located at the maximal physical distance from the cordless antenna. Moreover, the BLUETOOTH antenna may use a polarization different from the cordless antenna. The BLUETOOTH antenna can be made directional to favor the direction opposite to the WDCT antenna. Moreover, a user of the system can be instructed as to the ideal location of the cellular telephone while wirelessly coupled to the base station (e.g., on the table surface beside the BLUETOOTH side of the base station). In an embodiment of the present invention, base station 210 and cellular telephones 221 can use a version or enhancement of the BLUETOOTH standard that can "mark and avoid" interfering frequencies. Base station 210 can also manage its communications with cordless handsets 211 to "mark and avoid" interfering frequencies. As WDCT and BLUETOOTH both work in 2.4 GHz ISM band, they would likely interference with each other. To avoid the interference, WDCT and BLUETOOTH could have interference scheme which marks certain frequencies as bad frequencies, such as adaptive frequency hopping, and replaces these bad frequencies with good frequencies or other techniques. For example, known systems having WDCT engine incorporate such a "mark and avoid" frequency management system.

Figure 5:
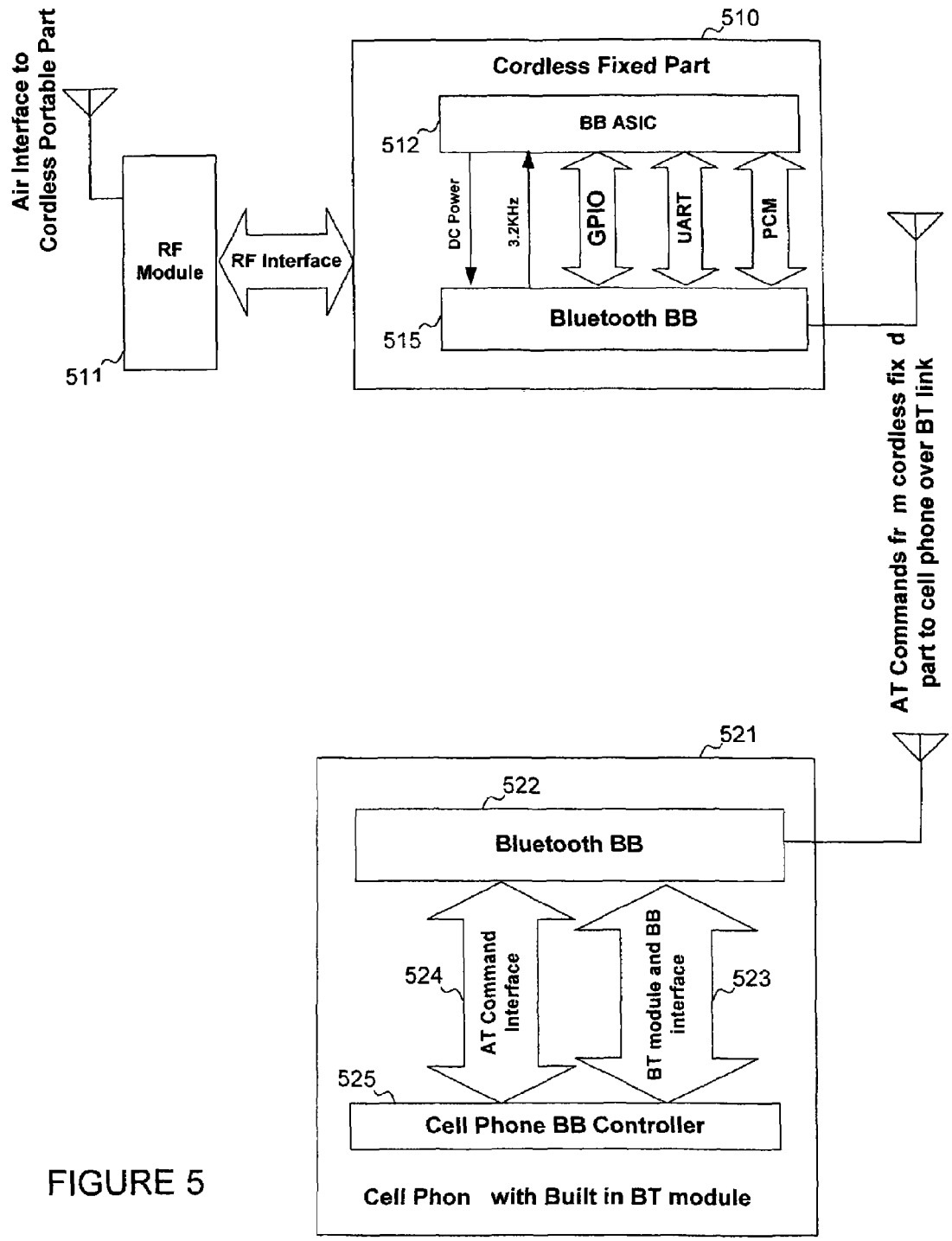
FIG. 5 shows a system diagram of another embodiment of the present invention for wireless communications between a cellular telephone and a landline telephone base station.

FIG. 5 shows a system diagram of another embodiment of the present invention for wireless communications between a cellular telephone and a landline telephone base station. An RF module 511 is a part of a cordless handset (e.g., cordless handset 211) and communicate via an RF interface with a cordless fixed part 510, which can be a cordless base station (e.g., similar to base station 210). Cordless fixed part 510 can communicate with a cellular telephone BLUETOOTH module 521 using, for example, AT commands over a BLUETOOTH communications link for data communications.

In an embodiment, cordless fixed part 510 can include a baseband ("BB") ASIC (i.e., Application Specific Integrated Circuit) 512, which can receive, for example, voice and data communications that are to be transmitted via the BLUETOOTH communications link to cellular telephone BLUETOOTH module 521. Baseband ASIC 512 can communicate with a BLUETOOTH baseband module 515 via, for example, general purpose input/output ("GPIO") communications, universal asynchronous receiver/transmitter ("UART") communications, pulse code modulation ("PCM") communications, and so on. In an embodiment, baseband ASIC 512 can provide direct current ("DC") power to BLUETOOTH baseband module 515.

Cellular telephone BLUETOOTH module 521 can include a BLUETOOTH baseband module 522 that sends and receives communications via the BLUETOOTH communications link to and from BLUETOOTH baseband module 515 of cordless fixed part 510. BLUETOOTH baseband module 522 can communicate with cellular telephone baseband controller 525 via, for example, an AT command interface 524, a BLUETOOTH module and baseband interface 523, and so on.

According to an embodiment of the system illustrated in FIG. 5, a system can have certain software requirements. For example, the AT commands originating from cordless fixed part 510 are transferred to BLUETOOTH baseband module 515 embedded in fixed part 510 over UART or USB. These commands are sent to the BLUETOOTH module embedded in the cellular handset as "ACL packets or DV packets or DM1 packets over SCO link if an audio link is present. Embedded BLUETOOTH module 521 in the cellular handset can forward the AT commands after BLUETOOTH packet de-parcing to the cellular handset and send the response back to cordless fixed part 510 over the BLUETOOTH wireless communications link. For example, below are some of the AT commands that can be used by the fixed part of a cordless unit (e.g., a cordless base station):

| | |
|---|---|
| ATZ | Reset |
| ATA | Answer |
| ATH | Hang Up |
| ATDn; | Dial voice call |
| AT + CLIP = 1 | Enable Caller Id |
| AT + VTS = n | Send DTMF tone during call (not used) |
| AT + CPAS | Get call status |
| AT + CPBS | Get telephonebook storage statistics (number of entries) |
| AT + CPBR | Read Phonebook entry |
| AT + CBC | Get Battery Charge level (not used) |
| AT + CCWA = 1 | Enable type II CID |
| AT + CREG? | Get network registration status |

Messages from the cellular handset can include the following:

| | |
|---|---|
| OK | Command executed correctly |
| ERROR | Communications error, or command failed |
| RING | Incoming call - repeated about every 3 seconds while ringing |
| +CLIP = c | Incoming Caller ID |
| NO CARRIER | Call ended |
| BUSY | Far end busy (response to ATD command) |
| NO ANSWER | Dial failed |
| +CPAS: | call status |
| +CPBS: | phonebook storage stats |
| +CPBR: | phonebook entry |
| +CBC: | battery charge level |
| +CCWA: | type II CID |
| +CREG: | network registration status |

In an embodiment of the present invention, a data connection is established for the purpose of exchanging AT commands between a cordless unit fixed part and BLUETOOTH module in the cellular telephone supporting headset profile.

Figure 6:
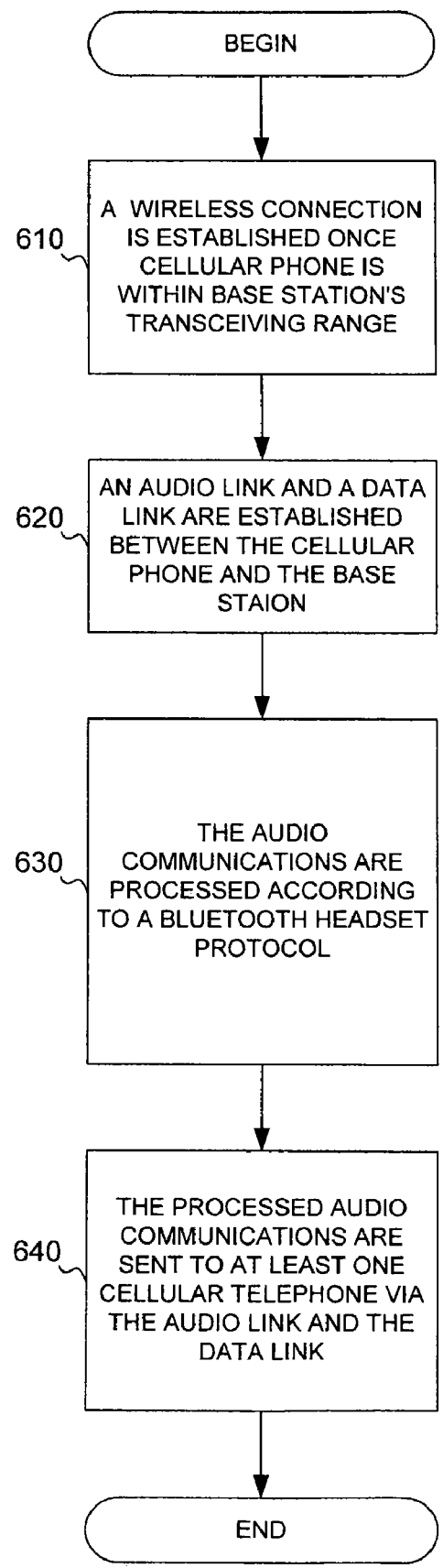
FIG. 6 shows an exemplary method in accordance with an embodiment of the present invention.

FIG. 6 shows a method in accordance with an embodiment of the present invention.

At step 610, a wireless communication is established once a cellular telephone is within a receiving range of a base station. In another embodiment of the present invention, the wireless communication is established between a landline telephone base station and two or more cellular telephones.

At step 620, an audio link is established between a gateway, with which cellular telephones are embedded, and a headset function, which is integrated with a landline telephone base station. To support data exchange, a data link using ACL and SCO connections is also established between the gateway and the base station. The ACL connection is used for sending data packets and the SCO connection is used for sending audio packets. In alternative embodiment, some of the data packets can also be sent over the SCO connection. Audio and data communications are then received from a telephone handset of a telephone user.

At step 630, audio communications are processed according to a BLUETOOTH headset protocol as described with reference to FIG. 3. As mentioned above, an ACL link is required to establish and break audio connection such that once the audio link is established, a data and audio exchange between the cellular telephone and the base station is carried out via the audio link.

At step 640, the base station uses a connection over a BLUETOOTH interface to send AT commands to the cellular telephone. The cellular telephone also responds to AT commands over the BLUETOOTH interface. In an embodiment in which two or more cellular telephones are registered in the landline telephone base station, a cellular telephone identifier is received that identifies which cellular telephone should receive the processed audio communications.

While preferred embodiments of the present invention have been described with respect to a cordless telephone base station, embodiments of the present invention are not limited to cordless telephone. In an embodiment, the base station 210 can be a landline telephone with a corded handset, a line extension, a contact-less docking station for coupling a BLUETOOTH cellular telephone to an RJ45 telephone system, and so on. In another embodiment of the present invention, the mobile BLUETOOTH devices that communicate with base station 210 include not only cellular telephones 221 but also PDAs or other BLUETOOTH enabled devices for wireless communication. For example, the BLUETOOTH enabled PDAs, wireless e-mail devices, digital organizers, or PCs can store telephone related information, such as, for example, address book information. In accordance with embodiments of the present invention, base station 210 and/or cordless handset 211 can access the information stored in the BLUETOOTH enabled devices. Furthermore, while preferred embodiments of the present invention have been described as using BLUETOOTH communications, other wireless communications, such as 802.11 communications, or Infrared Data (IrDA) can be used. In addition, other wireless communication technologies, such as ZigBee or any other propriety wireless link can also be used.

In accordance with the present invention, a direct link between a cordless handset and a cellular telephone is also possible, provided that the BLUETOOTH module could be supported directly from the cordless handset. In this case, all the BLUETOOTH software and hardware are built in the base station.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for exchanging data and audio between a cellular telephone and a landline telephone, the system comprising:
   a cordless telephone base station having a first radio transceiver for wirelessly communicating with a cellular telephone using a short-range RF communications technology, a second radio transceiver for communicating with a cordless handset associated with the cordless telephone base station, and an audio router configured to send and receive audio signal communications with a short-range wireless communication protocol stack and transcoder, and to send and receive audio signal communications with a cordless protocol stack and transcoder;
   a man machine interface that includes at least one menu located in one or more of the cordless handset and base station and is configured to indicate the presence or absence of registered cellular telephones within a wireless communications range of the base station; and
   the cordless handset having a third cordless radio transceiver configured to communicate with the cordless telephone base station using cordless radio frequency communications, and
   wherein when the cellular telephone is within the wireless communication range of the first radio transceiver of the cordless telephone base station, the first radio transceiver and the second radio transceiver of the cordless telephone base station are activated to exchange data and audio with each other and the cordless handset communicates with the cellular telephone, wherein the exchange of audio is established between the cellular telephone and the telephone base station by using a short-range wireless communications headset profile embedded in the telephone base station of the landline telephone and the cellular telephone for exchanging audio packets when an audio exchange is required, and
   wherein the audio router is configured to couple, at least in part, the cellular telephone to the landline telephone base station.

2. The system of claim 1, wherein the cordless telephone base station includes a short-range wireless communications module including hardware and software used for the first radio transceiver, and cordless protocol stack and transcoder coupled to the cordless radio transceiver.

3. The system of claim 2, wherein the short-range wireless communications module supports a headset profile though which the cordless telephone base station and the cellular telephone communicates with each other.

4. The system of claim 2, wherein the short-range wireless communications module establishes an audio link for exchanging audio messages between the cordless telephone base station and the cellular telephone.

5. The system of claim 2, wherein the short-range wireless communications module establishes a data link for exchanging data between the cordless telephone base station and the cellular telephone.

6. The system of claim 1, wherein when the first and second radio transceivers of the base station are activated to exchange data and audio with each other, the cordless handset is able to receive incoming calls and make outgoing calls for the cellular telephone.

7. A system for wireless communications between a cellular telephone and a landline telephone, the system comprising:
   a telephone base station associated with the landline telephone including a short-range wireless transceiver, a first cordless radio transceiver, and an audio router;
   one or more handsets, each handset comprising a second cordless radio transceiver configured to communicate with the first cordless radio transceiver of the telephone base station using radio frequency communications;
   one or more-cellular telephones employing a short-range wireless communications technology compatible with the short-range wireless transceiver of the telephone base station so that when a cellular telephone of the one or more-cellular telephones is in a range of the short-range wireless transceiver, a wireless communication is established between the cellular telephone and the telephone base station; and
   a man machine interface that includes at least one menu located in one or more of the cordless handset and base station and is configured to indicate the presence or absence of the one or more cellular telephones when the one or more cellular telephones are within a wireless communications range of the base station,
   wherein the audio router is configured to send and receive audio signal communications with a short-range wireless communication protocol stack and transcoder, and to send and receive audio signals communications with a cordless protocol stack and transcoder, and
   when the wireless communication is established, an audio link is established between the cellular telephone and the telephone base station by using a short-range wireless communications headset profile embedded in the telephone base station of the landline telephone and the cellular telephone for exchanging audio packets when an audio exchange is required.

8. The system of claim 7, wherein a data link is established using an Asynchronous Connectionless Link (ACL) connection along with the audio link to support data exchange between the cellular telephone and the telephone base station.

9. The system of claim 7, wherein the one or more handsets further include cordless radio transceivers and antenna.

10. The system of claim 7, wherein when the wireless communication is established, one of the one or more handsets is used to receive incoming calls for the cellular telephone and to send outgoing calls on the behalf of the cellular telephone.

11. A method for establishing wireless communications between a cellular telephone and a landline telephone, the method comprising:
 providing a menu that is configured to indicate only cellular telephones registered with the landline telephone that are within a wireless communications range of a base station of the land line telephone;
 establishing a wireless communications link between the landline telephone and the cellular telephone when the cellular telephone is within a range of transceiver of the base station of the landline telephone and is registered with the base station, wherein the landline telephone base station communicates with one or more telephone handsets of the landline telephone;
 establishing an audio link between the cellular telephone and the landline telephone when the wireless communications link between the landline telephone and the cellular telephone is established, wherein the audio link is established by using a short-range wireless communications headset profile embedded in the base station of the landline telephone and the cellular telephone for exchanging audio packets when an audio exchange is required, and wherein the landline telephone base station comprises an audio router configured to send and receive audio signal communications with a short-range wireless communication protocol stack and transcoder, and to send and receive audio signals communications with a cordless protocol stack and transcoder;
 receiving audio communications from the one or more telephone handsets of the landline telephone;
 processing the audio communications at the base station of the landline telephone according to a wireless communications protocol corresponding to a wireless transceiver of the cellular telephone; and
 sending the processed audio communications to the cellular telephone via the audio link.

12. The method of claim 11, further comprising:
 establishing a data link using Asynchronous Connectionless Link (ACL) connection between the cellular telephone and the landline telephone base unit for supporting data exchanges between the cellular telephone and the landline telephone base unit.

13. The method of claim 11, wherein the cellular telephone and the landline telephone both employ a short-range communications technology.

14. The method of claim 11, wherein the landline telephone base station comprises two transceivers, one of which is a cordless link transceiver for use in receiving/sending messages to the one or more headset, and the other one of which is a short-range wireless communications transceiver for use in receiving/sending messages to the cellular telephone.

15. The method of claim 14, wherein the wireless communication link between the landline telephone and the cellular telephone is established, the two transceivers of the landline telephone base station are activated to exchange data and audio with each other and one of the one or more handset is used to receive incoming calls and make outgoing calls for the cellular telephone.

16. The method of claim 11, wherein sending the processed audio communications to at least one of the cellular telephones via the audio link includes sending AT (ATtention) commands.

17. The method of claim 16, wherein the AT commands are sent using data packets over an ACL (Asynchronous Connectionless link) connection.

18. The method of claim 16, wherein the AT commands are sent using one of the audio packets, the data packets, and a combination of audio packets and data packets.

19. The method of claim 16, wherein the AT commands are sent using data packets over an audio (SCO) connection.

20. The method of claim 11, further comprising establishing a direct wireless communication link between the cellular telephone and a cordless handset that is communicating with a landline telephone base station employing a short-range wireless communications technology when the cellular telephone is within a range of the landline telephone base station.

\* \* \* \* \*